United States Patent [19]
Fournell et al.

[11] 3,763,744
[45] Oct. 9, 1973

[54] CONTROL ARRANGEMENT WITH A PULSE-LENGTH MODULATOR FOR A PISTON

[75] Inventors: Hans-Dieter Fournell, Bietigheim; Karl-Heinz Adler, Leonberg; Johannes Locher, Stuttgart, all of Germany

[73] Assignee: Robert Bosch GmbH, Stuttgart, Germany

[22] Filed: Mar. 11, 1971

[21] Appl. No.: 128,607

[30] Foreign Application Priority Data
Mar. 12, 1970 Germany.................. P 20 11 713.9

[52] U.S. Cl............................. 91/20, 91/32, 91/363, 91/417, 91/450
[51] Int. Cl. ...... F15b 15/17, F15b 9/03, F15b 9/09
[58] Field of Search.................. 91/363 R, 457, 275, 91/417, 20, 32, 450

[56] References Cited
UNITED STATES PATENTS
3,266,378  8/1966  Shaw................................ 91/363 R
3,295,421  1/1967  McCormick....................... 91/363 R
3,618,469  11/1971  Wills et al........................... 91/417 R Primary Examiner—Paul E. Maslousky
Attorney—Michael S. Striker

[57] ABSTRACT

A servo loop for correcting the position of a piston operating against a load has a control unit comprising a three point regulator for operating two on-off valves and a pulse length modulator for operating a switch over valve, the on-off and switch over valves being connected to the piston cylinder, a pressure tank, and a collection tank, so as to move the piston in either of two directions. The three point regulator and the pulse length modulator are driven by the difference between the desired signal and the actual signal, the latter being obtained from an inductive displacement pickup coupled to the piston rod.

16 Claims, 5 Drawing Figures

INVENTORS
Hans-Dieter FOURNELL
Karl-Heinz ADLER
Johannes LOCHER

By *[signature]* their ATTORNEY

INVENTORS
Hans-Dieter FOURNELL
Karl-Heinz ADLER
Johannes LOCHER

By *[signature]* their ATTORNEY

CONTROL ARRANGEMENT WITH A PULSE-LENGTH MODULATOR FOR A PISTON

BACKGROUND OF THE INVENTION

The invention relates to a hydraulic control arrangement having a piston and cylinder with an inlet chamber and an outlet chamber. Electromagnetic valves, operated by a control unit, control flow of hydraulic fluid from a pressure tank and to a collection tank.

Hydraulically operated distributors for gas turbines must be positioned quickly, very accurately, and with great force. The same demands are made of the hydraulic fine control elments that position the adjusting rod of a diesel fuel injection pump controlled by an electronic regulator.

Servo valves are used for precision control arrangements, these valves converting a continuously varying electrical signal into a proportional flow of hydraulic fluid. These valves can control the movement of a piston very precisely, but they are expensive, precision made, products, and for that reason not suitable for mass produced equipment. Moreover, as precision components, they are sensitive to contamination of the hydraulic fluid and to strong vibrations, among other factors, and therefore are not suitable for operation under severe conditions.

SUMMARY OF THE INVENTION

An object of the invention is a simple and inexpensive control arrangement for a hydraulic piston.

Another object of the invention is the arrangement of the preceding object suitable for mass production.

A still further object of the invention is a control arrangement for a hydraulic piston, which control arrangement operates quickly and accurately.

A further object of the invention is a control arrangement of the previous object, which control arrangement positions the piston with an accuracy of at least 1 percent of the desired position.

Another object of the invention is a control arrangement for a hydraulic piston, which control arrangement is suitable for operation under severe conditions, such as those found in a motor vehicle.

Briefly stated, the invention consists of piston means, pressure tank means, collection tank means, electromagnetic valve means for alternately connecting the piston means to the pressure tank means and to the collection tank means so as to cause movement of the piston means in either of two directions, and control means, including pulse length modulation means, for providing electrical signals to operate the valve means so as to cause movement of the piston means toward the desired position corresponding to a desired value, the pulse length modulation means having a predetermined keying ratio when the piston means is at the desired position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
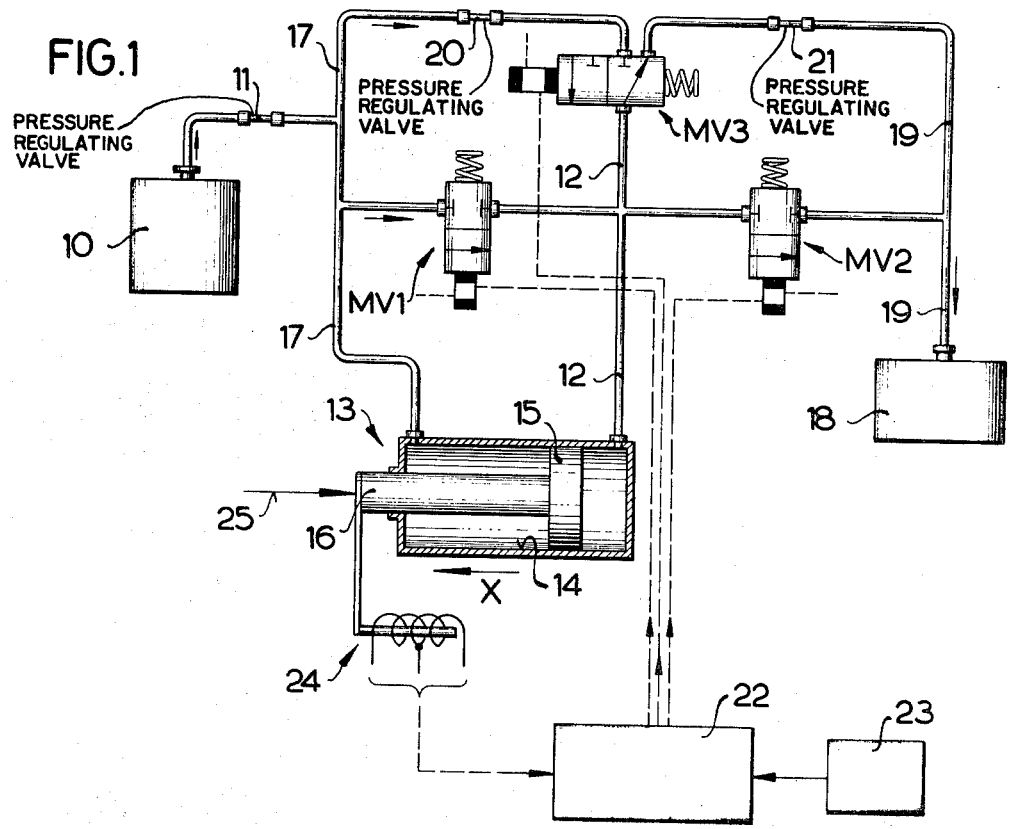
FIG. 1 is a block diagram of one embodiment of the invention.

With reference to FIG. 1, the hydraulic control arrangement of the invention includes first valve means including two one-way electromagnetic first valves MV1 and MV2 and a parallel connected electromagnetic two-way, or switch over, second valve means MV3. A pressure regulating valve 11 connects the valve MV1 to a pressure tank 10, and a line 12 connects this valve to the inlet of a hydraulic cylinder and piston arrangement 13. The inlet of the arrangement 13 is defined as being that opening through which hydraulic fluid enters the piston chamber (the inflow chamber) to act on the piston face opposite the piston rod 16, whereas the outlet is defined as that opening which communicates with the piston chamber (the outflow chamber) containing the piston rod 16. The hydraulic arrangement 13 comprises a cylinder 14, a piston 15, and a piston rod 16. The values MV1 and MV2 control the fast movement of the piston 15 to approximately the piston position corresponding to the desired value. The valve MV3 is a fine control for the piston movement in the immediate neighborhood of this position. A line 17 connects the piston outlet to the pressure tank 10. The electromagnetic valve MV2 is connected to the line 12 and by a line 19 to a collection tank 18. A pressure regulating valve 20 connects the line 17 to one connection of the electromagnetic switch over valve MV3, the other connection of this valve being connected by a pressure regulating valve 21 to the line 19. The electromagnetic first valve means MV1, MV2, and second valve means MV3 are operated by a common control unit 22, the electrical connections between the latter and these valves being denoted by the dashed lines. The control unit 22 is furnished with a desired value by an electrical signal generator 23, which will not be further described. The control unit is also supplied with an actual value by an electric signal generator 24, which is coupled to the piston rod 16. The arrow X indicates the direction in which the piston rod moves when it works against a load denoted symbolically by an arrow 25.

The valves MV1 and MV2 operate as on-off valves, the amount of hydraulic fluid passing through them being limited solely by the pressure regulating valve 11. Since the valve MV3 operates as a switch over valve, one of the two lines 17 and 19 is always connected by the respective pressure regulating valve 20 or 21 to the line 12. If the piston 15 is to move in the direction of the arrow X, the valve MV1 is first of all opened and the valve MV2 is closed. The hydraulic fluid, which is under pressure, is thus free to flow through the line 12 and into the inflow chamber of the piston 13, as well as through the line 17 and into the outflow chamber of the piston. Since the face of the piston 15 in the inflow chamber is larger than the opposite piston face by an amount equal to the cross-sectional area of the piston rod 16, the piston 15 is caused to move to the left against the load 25. If the piston is to move in the opposite direction, the valve MV1 is closed and the valve MV2 is opened. A force of equal magnitude in either direction of piston movement is obtained when the effective area of the two faces of the piston 15 have a ratio of 2 : 1. This means that the effective area of the piston face in the outflow chamber is equal to the cross-sectional area of the piston rod 16. When valve MV1 is open and valve MV2 is closed, the pressure of the hydraulic fluid acts through the line 17 and on the piston face in the outflow chamber. Because of the ratio between the effective surface areas of the two piston faces, the piston 15 is caused to move in the direction of the arrow X, even though both piston faces are under the same pressure. As soon as the piston rod 16 is moved to near the desired position (corresponding to the desired value supplied by the desired signal generator 23), the electromagnetic valve MV1 is closed; and the electromagnetic valve MV3 now assumes the role of precisely positioning the piston. The valve MV3 is operated by a pulse length modulated signal from the control unit 22. If the deviation between the desired value and the actual value (in other words, between the desired position and the actual position of the piston) is still relatively large, the periods during which the line 12 is connected to the line 17 are appreciably longer than the periods during which the line 12 is connected to the line 19.

Only when the deviation is zero are these two periods of equal length, the piston rod 16 oscillating back and forth about the desired position. Care must be taken that the frequency at which the valve MV3 is controlled is so chosen that this valve is able to follow exactly the signals from the control unit 22, and that it does not, because of its inertia, operate imprecisely.

The signal generator 24 is advantageously an inductive displacement pickup, since this design avoids sliding contacts and substantially improves reliability.

The manner in which the illustrated exemplary embodiment operates is as follows.

Assume that piston 15 is in the illustrated position, and that the desired position, set by unit 13, is leftwards of the illustrated position by a considerable amount, requiring a sizable initial coarse adjustment of the piston position. Control means 22 senses the need for an initial coarse adjustment, by determining that the difference between the actual and desired piston positions is greater than a predetermined value, or equivalently, outside a fine-adjustment range centered about zero. Control means 22 also determines the algebraic sign of the difference, indicating the direction in which the piston is to be moved.

Assuming that piston 15 is to be moved leftwards, control means 22 merely keeps valve MV2 closed, and opens valve MV1, valves MV1 and MV2 having both been closed prior to this moment in the steady-state condition of the arrangement. Two-position valve MV3 is so actuated as to permit fluid flow to conduit 12 from the shunting conduit including valve 20, and thus preventing fluid flow between conduit 12 and the shunting conduit section which includes valve 21.

With the valves so actuated, pressure fluid flows from source 10 through both conduit sections 17, i.e., directly to the left-hand cylinder chamber, and also to the right-hand cylinder chamber via valve MV3 and conduit 12, on the one hand, and via valve MV1 and conduit 12, on the other hand. Accordingly the left-hand and right-hand cylinder chambers will be at identical pressure. However, inasmuch as the effective area of the right-hand piston end face is twice that of the left-hand piston end face, the leftwards force will be twice the rightwards force, and the piston will be moved leftwards. This initial coarse adjustment will occur relatively fast.

Quickly, the difference between the actual and desired values of piston position will decrease below a predetermined value, indicating that the coarse adjustment is to end and that the supplementary fine-adjustment of piston position is to commence At this point, control means 22 closes valve MV1, and further movement of the piston towards the desired position is effected solely by actuation of two-path valve MV3, in this embodiment.

As indicated schematically in FIG. 1, valve MV3 is normally spring biased to permit fluid communication between upper conduit section 12 and the shunting conduit containing valve 21. However, when control means 22 supplies a current pulse to the magnetic winding of two-path valve MV3, valve MV3 will terminate the communication between conduit 12 and conduit 19, and will effect communication between conduit 12 and conduit 17—for the duration of such current pulse.

Control means 22 includes pulse-length-modulating means, to be described in detail below. The pulse-length-modulating means generates a train of pulse-length-modulated pulses, according to well known principles. In the illustrated embodiment, the keying ratio—i.e., the ratio of the pulse-duration to the time interval between successive pulses—varies as a function of the difference between the desired and actual piston positions, and as a function of the algebraic sign of such difference.

The effect of valve MV3 on piston movement will be self-evident. When valve MV3, in response to electromagnetic actuation, permits fluid communication between conduits 12 and 17 (valve MV1 has already been closed), pressure on both sides of piston 15 will be identical. Because the surface area of the right piston end face is greater than that of the left end face, piston 15 will be moved leftwards. Conversely, when in the absence of an actuating current pulse, MV3 permits fluid communication only between conduits 12 and 19, piston 15 is moved rightwards. This is because pressure fluid from source 10 enters the left-hand cylinder chamber, whereas pressure fluid in the right-hand cylinder chamber flows out via conduit 12, valve MV3 and conduit 19 to fluid collection tank 18.

It will be appreciated that the direction of piston movement is determined by the aforementioned keying ratio of the pulse-length-modulated pulse train, during the fine-adjustment phase of piston movement. If the piston is to move leftwards in the illustrated embodiment, the pulse-duration must be longer than the time interval between successive pulses. If the piston is to move rightwards in the illustrated embodiment, then the pulse-duration must be shorter than the time interval between successive pulses. The keying ratio is dependent on the difference between the desired and actual piston positions, and when the difference approaches zero, the keying ratio approaches a fixed value which will cause the piston, in the steady-state, to oscillate steadily about the desired value, very slightly.

It should be noted that the surface area of the right-hand piston end face is twice that of the left-hand piston end face. It follows, therefore, that the leftwards force to which the piston is subjected when both cylinder chambers are under pressure is exactly equal in magnitude to the rightwards force to which the piston is subjected when only the left-hand cylinder chamber is under pressure. Accordingly, there is force symmetry in this arrangement. Furthermore, once the desired piston position has been reached, the keying ratio will become 1 : 1, i.e., the pulse-duration will be equal to the time interval between successive pulses, and the piston will oscillate steadily, although only slightly, about the desired position.

Figure 2:
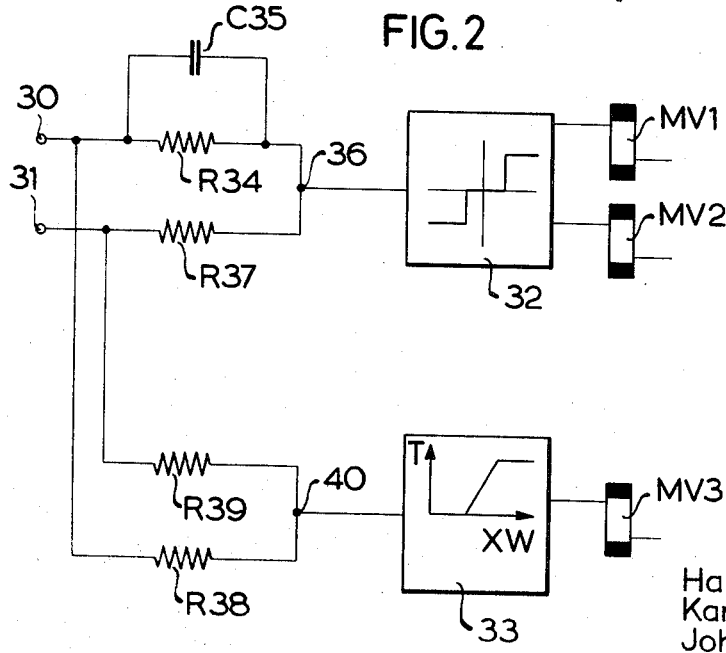
FIG. 2 is a block diagram of the control unit.

FIG. 2 is a block diagram of the control unit 22. The inputs 30 and 31 are respectively connected to the actual value signal and the desired value signal. The control unit 22 comprises valve-actuating means, here a three point regulator 32 and a quasi-stabilized pulse length modulator 33, the input of which latter is connected in parallel with the input of the regulator 32. The two electromagnetic valves MV1 and MV2 are connected to the output of the regulator 32. The output of the regulator 32 shifts between first and second limiting values, in one of which the valve MV1 is open and in the other of which the valve MV2 is open. In the dead zone defined between these first and second limiting values both of the valves MV1 and MV2 are closed. The switch over valve MV3 is connected to the pulse length modulator 33. The difference between the actual value and the desired value is formed by the voltage drops across resistors, the polarity of the actual value and of the desired value necessarily being so chosen that the desired deviation between these two values appears at the summation junction. A resistor 34 and a parallel connected capacitor 35 connect the input terminal 30 to a summation junction 46 at the input of the three point regulator 32; a resistor 37 connects the other input terminal 31 to this same junction. The resistors 38 and 39 respectively connect the inputs 30 and 31 to a second summation junction 40 that is connected to the input of the pulse length modulator 33.

The circuit thus far described operates in the following manner. If the deviation between the desired signal and the actual signal exceeds a predetermined value, the output of the regulator 32, in dependence on the polarity of the deviation, swings to one or the other of its first and second limiting values, thereby operating one of the two electromagnetic valves MV1 and MV2. If the loading is small, it can occur that the actual value changes so rapidly that the dead zone has been traversed before the valve can respond. This disadvantage is avoided by the capacitor C35, which provides an approximate first time derivative of the actual value that is added to the signal at the summation junction 36. This additional signal causes an apparent increase in the size of dead zone of the regulator 32, and ensures that the dead zone will not be overshot before the valve can respond. While the valve MV1 or MV2 is open, the valve MV3 can also be in one of its two positions, which it assumes when the pulse length modulator is over driven. The region in which the keying ratio of the pulse length modulator changes approximately coincides with the region of the dead zone of the regulator 32. The operation of the valves MV1 and MV2 is assisted by the state of the valve MV3. As soon as the pulse length modulator is in its linear region, it operates with a keying ratio that changes in proportion to the deviation until the desired value is reached, the deviation then being zero, and the keying ratio being some predetermined value, such as 1 : 1.

If the control unit 22 contained only a three point regulator, the positioning accuracy would be limited by the dead zone of the regulator; and the switching frequency would result from the time response characteristic of the servo loop.

If the control unit 22 had only a two point regulator, the piston would be caused to oscillate markedly back and forth across the desired position, since the valves controlled by the regulator would be used both for high speed positioning of the piston as well as for holding the piston at the desired position.

With the arrangement of the invention there is also a continuous oscillation about the desired value; but the flow of hydraulic fluid through the valve M3 can be sufficiently limited, and the control frequency of the pulse length modulator 33 can be chosen sufficiently high, so that the path over which the piston oscillates remains sufficiently small to insure the desired accuracy of better than or equal to 1 percent. The maximum flow through the valves MV1, MV2, and MV3 is determined by the pressure regulating valves 11, 20, and 21. In a particularly advantageous embodiment of the invention, the cross sectional areas of the valves MV1, MV2, and MV3 can be dimensioned to act as pressure regulating valves.

Figure 3:
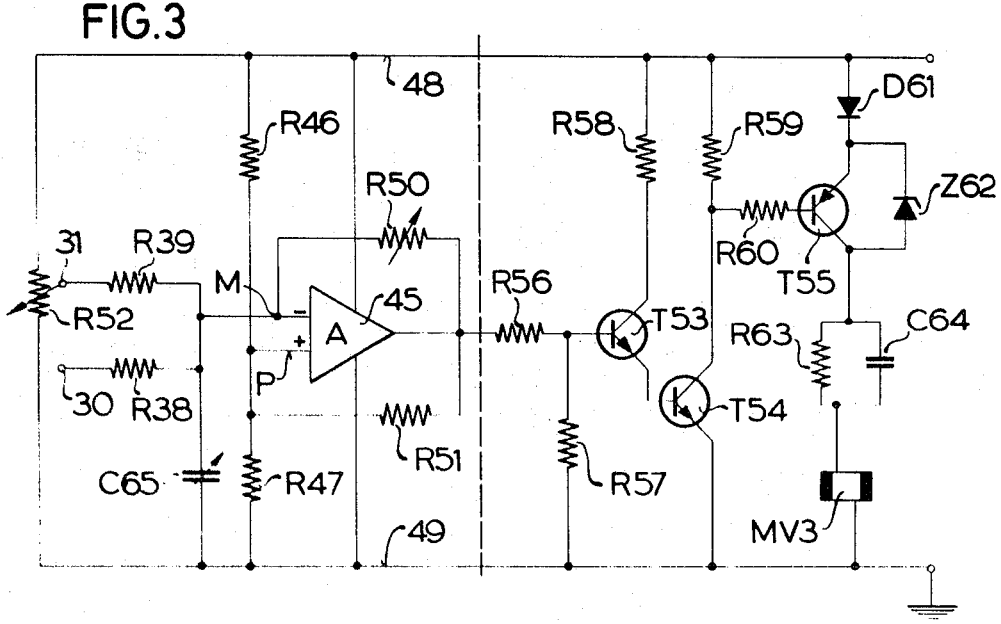
FIG. 3 is a wiring diagram of the pulse length modulator of the control unit.

FIG. 3 is a schematic diagram of one embodiment of the quasi-stabilized pulse length modulator 33, the modulator incorporating an operational amplifier 45. The amplifier 45 has two inputs, an inverting input M and a non-inverting input P; the input circuit of the operational amplifier can comprise, for example, a differential amplifier. The non-inverting input is connected to the tap of a voltage divider composed of the resistors R46 and R47, the resistor R46 being connected to the positive rail 48 connected to a source of voltage + $Ub$ and the resistor 47 being connected to the grounded rail 49. An adjustable load resistor R50 connects the output of the operational amplifier to the inverting input, and a positive feedback resistor R51 connects the output of the operational amplifier to the non-inverting input. The operational amplifier is connected to the rails 48 and 49 for power. The input terminal 31 (desired value) is connected to the tap of an adjustable resistor R52, which is connected between the rails 48 and 49. The signal of the desired value at the tap of the resistor R52 is conducted by resistor R39 to the summation junction 40, which is connected by an adjustable capacitor C65 to the grounded rail 49. The electrical output of the operational amplifier 45 is conducted by a three stage power amplifier, comprising the transistors T53, T54, and T55, to the electromagnetic valve MV3.

The base of transistor T53 is connected by a resistor R56 to the output of the operational amplifier 45 and by a resistor R57 to the grounded rail 49. The collector of the transistor T53 is connected by a resistor R58 to the positive rail 48, the emitter of this transmitter being directly connected to the base of the transistor T54, the emitter of which is directly connected to the grounded rail 49 and the collector of which is connected by a resistor R59 to the positive rail 48. The two transistors T53 and T54 comprise a Darlington amplifier. A resistor R60 connects the collector of the transistor T54 to the base of transistor T55, the emitter of which latter is connected by a diode D61, connected with forward polarity, to the positive rail 48. The emitter collector path of this transistor is shunted by a Zener diode Z62, which becomes conductive when the emitter-collector voltage exceeds the Zener voltage, the diode thereby determining the maximum emitter-collector voltage. A resistor R63 and a capacitor C64, connected in parallel, connect the collector of the transistor T55 to one terminal of the valve MV3, the other valve terminal being connected to the grounded rail 49.

In explaining the circuit shown in FIG. 3, it will be assumed at first that the positive feedback resistor R51 is out of circuit. If the same voltage is present at the inputs M and P, the voltage at the output of the operational amplifier 45 is determined by the voltage across the resistors R46 and R47. If the voltage at the summation junction 40 rises, thereby raising the voltage at the inverting input M, the voltage at the output of the operational amplifier falls. On the other hand, if the voltage at the summation junction becomes less positive, the voltage at the operational amplifier output becomes more positive. It will now be assumed that the positive feedback resistor R51 is in circuit. The voltage of the inverting input M is now so positive that the operational amplifier 45 is over driven; consequently, the output voltage of the operational amplifier is approximately at ground potential. When the output voltage is approximately at ground potential, the resistors R47 and R51 are connected in parallel, and the ratio between resistors R46 and R47 of the voltage divider changes. On the other hand, if the voltage at the inverting input M is so negative that the operational amplifier 45 is over driven in the other direction and its output voltage is approximately +U$b$, the positive feedback resistor R51 is connected in parallel with the resistor R46 of the voltage divider; and the voltage at the non-inverting input P changes in the positive direction. Thus, the voltage at the non-inverting input P does not remain constant, but jumps between two limiting values that result from the fact that the positive feedback resistor R51 is connected in parallel either with the voltage divider resistor R47 or with the voltage divider resistor R46, as soon as the output voltage of the operational amplifier either is approximately at the voltage +U$b$ or at ground potential. For a balanced condition (in which a keying ratio —1 : 1, for example— corresponding to the desired value appears at the operational amplifier output, and in which the deviation is zero) the voltages at the inputs M and P must be exactly equal, if the positive feedback resistor R51 is not in circuit.

If the positive feedback resistor R51 is in circuit and the summation junction 40 is at the corresponding voltage, the electrical output of the operational amplifier follows a rectangular wave oscillation, as will now be explained. It will be assumed that the output voltage of the amplifier 45 has just jumped from ground potential to +U$b$. Consequently, the capacitor C65 has just discharged to such a value that the voltage at the input M has fallen below the voltage at the input P. Because of the inversion within the operational amplifier 45, this negative voltage difference between the inverting input and the non-inverting input causes the output voltage of the amplifier to become more positive. The capacitor C65 now begins to charge through the resistor R50 to a positive voltage. The voltage at which the output voltage of the operational amplifier jumps back to a ground potential is determined by the voltage at its non-inverting input; this voltage is determined by the parallel connection of the resistors R46 and R51, which are connected in series with the resistor R47, the resistors comprising a voltage divider to which the non-inverting input P is connected. Once the voltage across the capacitor C65 exceeds the new, constant, voltage at the input P, the positive voltage difference between the two inputs, because of the inversion within the amplifier 45, causes the output voltage to jump to approximately ground potential. The positive feedback resistor R51 is now connected in parallel with the resistor R47, and the capacitor C65 must discharge to a voltage that is below the voltage determined by the parallel connected resistors R47 and R51 before the operational amplifier is again triggered to cause the output voltage to jump to the other limiting value.

If the charging of the capacitor C65 is altered by a subsidiary addition or withdrawal of current, one of the two limiting states is lengthened and the other one is shortened. The output voltage of the operational amplifier is held at one of the two limiting values only when the alteration of the charging is so great that the described oscillation cannot continue, because the voltage at the inverting input M cannot rise above, or fall below, that at the non-inverting input P. The output amplifier connected between the valve MV3 and the amplifier 45 operates the valve in time with the rectangular output voltage of the amplifier 45.

Figure 4:
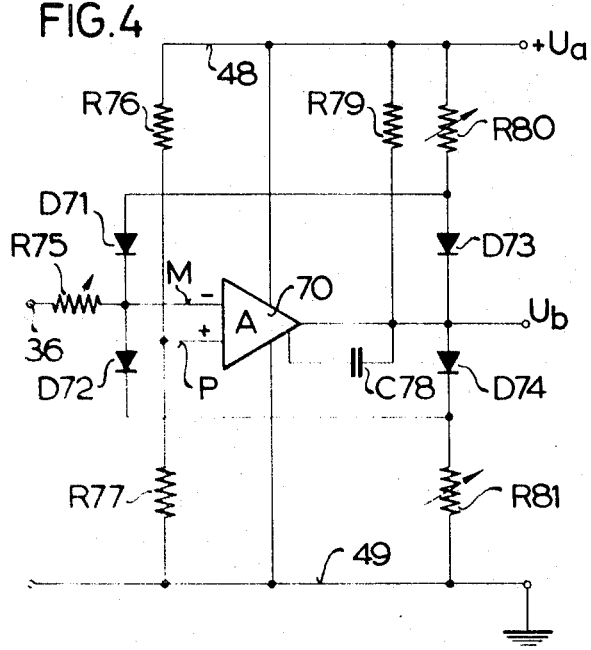
FIG. 4 is a wiring diagram of the three point regulator of the control unit.
Figure 4A:
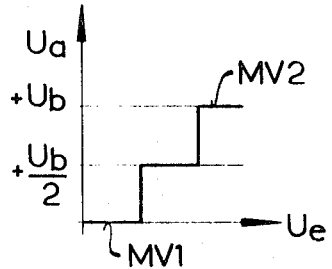
FIG. 4a graphically shows the output of the operational amplifier 70 plotted against the input voltage.

FIG. 4 is a schematic diagram of one embodiment of the three point regulator 32. The regulator has an operational amplifier 70 of which the output and the inverting input M are connected in the diagonal of a bridge composed of diodes D71 to D74. An adjustable resistor R75 connects the input M to the summation junction 36, which is also shown in FIG. 2. The non-inverting input P of the operational amplifier is connected to the tap of a voltage divider composed of the resistors R76 and R77 that are connected between the positive layer 48 and the grounded layer 49. The operational amplifier 70 is connected to the rails 48 and 49 for power. A capacitor C78 dynamically stabilizes the operational amplifier, which latter is unsymmetrical; the resistor R79 is the load resistor of the amplifier. The diodes of the bridge are connected in forward polarity, the anodes of the diodes D71 and D73 being connected by a resistor R80 to the rail 48, and the cathodes of the diodes D72 and D74 being connected by a resistor R81 to the rail 49.

The circuit just described operates in the following manner. If the diode bridge is so adjusted that the same voltages are present at the inverting and non-inverting inputs of the operational amplifier, the output voltage U$a$ of the amplifier will be approximately equal to this voltage, namely about one-half of the operating voltage plus U$b$. If now the diode bridge is loaded at the summation junction 46, causing an addition or withdrawal of current, the symmetry of the bridge is affected. As soon as the bridge is made sufficiently unsymmetrical so that the quiescent current in one leg of the bridge stops, the amplifier 70 no longer has any feedback, and the output voltage of the amplifier can assume a positive or negative limiting value depending on whether the voltage of the input is positive or negative. The size of the dead zone depends on the amount of quiescent current in the diode bridge as well as on the value of the resistor R75. When the quiescent bridge current is stopped, the voltage output of the operational amplifier 70 will be negative if the voltage at the inverting input M is more positive than the constant voltage at the non-inverting input P. If the opposite is true, the output voltage of the amplifier will be positive. The graph of FIG. 4 plots the output voltage Ua of the operational amplifier 70 against the voltage Ue at the summation junction 36.

It will be understood that each of the elements described above, or two or more together, may also find a useful application in other types of circuits differing from the types described above.

While the invention has been illustrated and described as embodied in a control arrangement with a pulse length modulator for a piston, it is not intended to be limited to the d3tails shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An hydraulic servo system, comprising a positionable member movable in a first direction and alternatively in an opposite second direction; means for selecting a desired position for said member; means for determining the actual position of said member; and electrohydraulic control means operative when the difference between the actual and desired positions is greater than a predetermined value for effecting rapid movement of said member in a single one of said directions towards the desired position, and operative when said difference is reduced to less than said value for causing said member to perform an oscillatory movement composed of longer motions in direction towards the desired position alternating with shorter motions in opposite direction so as to effect a net slower movement of said member to the desired position.

2. A system as defined in claim 1, wherein said member is a hydraulic piston movable in a hydraulic cylinder, and wherein said control means includes a source of pressurized fluid, conduit means for connecting said source of fluid and the interior of said cylinder, electrically actuated first valve means operative when actuated for so controlling the flow of fluid from said source to the interior of said cylinder as to effect rapid movement of said piston in one or the other of said directions, electrically actuated second valve means operative when actuated for so controlling the flow of fluid from said source to the interior of said cylinder as to cause said piston to perform said oscillatory movement, and valve-actuating means for causing said first valve means to effect rapid movement of said piston towards the desired position when said difference exceeds said value, and for causing said second valve means to cause said piston to perform said oscillatory movement when said difference is reduced to less than said value.

3. A system as defined in claim 2, wherein said valve-actuating means includes pulse-length-modulating means for generating a train of pulse-length-modulated pulses, the ratio of the duration of the pulses to the time interval between successive pulses varying as a function of said difference when said difference is less than said value, and wherein said valve-actuating means comprises means for so controlling said second valve means as to cause said piston to move in one of said directions during each of said pulses and in the opposite direction during the time intervals between successive pulses, so as to cause said piston to perform said oscillatory movement.

4. A system as defined in claim 3, wherein as said difference approaches zero said ratio approaches a value causing said piston to oscillate about the desired position in the steady state.

5. A system as defined in claim 2, wherein said valve-actuating means includes pulse-length-modulating means for generating a train of pulse-length-modulated pulses when said difference is less than said value, the ratio of the duration of the pulses to the time interval between successive pulses varying as a function of said difference when said difference is less than said value, and wherein said valve-actuating means comprises means operative only when said difference is less than zero for so controlling said second valve means as to cause said piston to move in one of said directions during each of said pulses and in the opposite direction during the time intervals between successive pulses, so as to cause said piston to perform said oscillatory movement.

6. A system as defined in claim 5, wherein as said difference approaches zero said ratio approaches a value causing said piston to oscillate about the desired position in the steady state.

7. A system as defined in claim 4, wherein said valve-actuating means is operative for causing said first valve means to effect said rapid movement of said piston towards the desired position only when said difference exceeds said value.

8. A system as defined in claim 2; and further comprising pressure-regulating valve means for regulating the pressure at which said fluid leaves said source.

9. A system as defined in claim 1, wherein said member is a hydraulic piston movable in a hydraulic cylinder and dividing the cylinder into two separate chambers located at axially opposite sides of said piston, and wherein said control means includes a source of pressurized fluid, a collection tank for fluid, a conduit connecting said source to one of said chambers, a further conduit connecting said source to the other of said chambers, an additional conduit connecting said other of said chambers to said tank, a first shunting conduit shunting said further conduit, a second shunting conduit shunting said additional conduit, first valve means comprising a pair of electrically actuated first valves, one disposed in said further conduit and the other disposed in said additional conduit, and operative when one or the other is actuated for effecting movement of said piston in one or the other of said directions, electrically actuated second valve means connected to said first shunting conduit and connected to said second shunting conduit for alternatively blocking flow through one or the other of said shunting conduits and operative when unblocking said first shunting conduit for effecting movement of said piston in one direction and operative when unblocking said second shunting conduit for effecting movement of said piston in the opposite direction, and valve actuating means operative when said difference exceeds said value for actuating the respective one of said first valves to effect said rapid movement of said piston towards the desired position, and operative when said difference is reduced to less than said value for actuating said second valve means to unblock said first and second shunting conduits alternately to cause said piston to effect said oscillatory movement.

10. A system as defined in claim 9; and further including a pair of pressure-regulating valves, one disposed in said first shunting conduit and the other disposed in said second shunting conduit.

11. A system as defined in claim 9, wherein said piston includes a piston rod mounted for sliding movement through an opening in the wall of said cylinder and wherein said rod extends through said one chamber.

12. A system as defined in claim 11, wherein said piston rod has a cross-sectional area substantially equal to the effective cross-sectional area of the respective axial end face of said piston.

13. A system as defined in claim 3, wherein said pulse-length-modulating means comprises an operational amplifier having an inverting and a non-inverting input, means for maintaining one of said inputs at a constant potential, a pair of input resistors each connected at one end to the other input of said amplifier, the other end of one of said input resistors being connected to said means for selecting a position for said member, and the other end of the other of said input resistors being connected to said means for determining the actual position of said member, an adjustable capacitor connected between ground and said other of said inputs of said amplifier, and adjustable feedback resistor connecting the output of said operational amplifier to said other input thereof, and a coupling resistor connecting the output of said operational amplifier to said one input thereof.

14. A system as defined in claim 7, wherein said valve-actuating means includes three-point regulator means comprising an operational amplifier having in its input circuit a diode-resistor network for determining the algebraic sign of said difference and whether said difference is less than said value.

15. A system as defined in claim 14, wherein said regulator means has an input to which is applied the sum of an electrical signal proportional to the position of said member, an electrical signal proportional to the rate of movement of said member and an electrical signal proportional to the desired position of said member.

16. A system as defined in claim 15, wherein said input of said regulator means has an input resistor connected to said means for determining the actual position of said member, and also a differentiating capacitor connected in parallel with said input resistor.

* * * * *